US008745201B2

(12) United States Patent
Park et al.

(10) Patent No.: US 8,745,201 B2
(45) Date of Patent: Jun. 3, 2014

(54) METHODS AND APPARATUS FOR PROCESSING DISCOVERY SIGNALS AND/OR CONTROLLING ALERT GENERATION

(75) Inventors: Vincent D. Park, Budd Lake, NJ (US);
Rajiv Laroia, Far Hills, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 12/395,052

(22) Filed: Feb. 27, 2009

(65) Prior Publication Data
US 2010/0223376 A1    Sep. 2, 2010

(51) Int. Cl.
*G06F 15/173* (2006.01)
*H04M 1/725* (2006.01)

(52) U.S. Cl.
USPC .......................... 709/224; 709/206; 455/412.2

(58) Field of Classification Search
CPC ... H04L 29/08072; H04L 29/06; H04L 43/00; H04L 12/58; H04L 12/585; H04M 1/725; H06Q 10/107
USPC ................. 709/201–207, 217–229; 455/412, 455/414.1, 412.1
See application file for complete search history.

(56) References Cited

U.S. PATENT DOCUMENTS

| 6,161,021 | A * | 12/2000 | Akpa ............................. 455/512 |
| 7,787,887 | B2 * | 8/2010 | Gupta et al. ................ 455/456.1 |
| 2002/0009184 | A1 * | 1/2002 | Shnier ....................... 379/142.01 |
| 2002/0183004 | A1 * | 12/2002 | Fulton et al. .................... 455/41 |
| 2005/0130634 | A1 | 6/2005 | Godfrey |
| 2006/0035681 | A1 * | 2/2006 | Oh ................................ 455/567 |
| 2007/0037605 | A1 | 2/2007 | Logan |
| 2007/0083637 | A1 * | 4/2007 | Greve ........................... 709/224 |
| 2007/0174448 | A1 * | 7/2007 | Ahuja et al. .................. 709/224 |

(Continued)

FOREIGN PATENT DOCUMENTS

| JP | 2000500623 A | 1/2000 |
| JP | 2000224197 A | 8/2000 |

(Continued)

OTHER PUBLICATIONS

International Search Report & Written Opinion—PCT/US2010/025268—International Search Authroity—European Patent Office—Jun. 1, 2010.

(Continued)

*Primary Examiner* — Yasin Barqadle
(74) *Attorney, Agent, or Firm* — James K. O'Hare

(57) ABSTRACT

Methods and apparatus for processing discovery signals and/or generating alerts based on received discovery signals are described. In at least some embodiments, alert signal generation is performed on a selective basis in response to received discovery signals. In at least some embodiments a user is given at least some control over alert generation with the user being able to indicate types of signals which should not trigger generation of an alert, the minimum permitted frequency of particular alerts or types of alerts and/or time or location constraints which are considered when a device determines whether or not to generate an alert in response to a received discovery signal. While user control of discovery signal processing and alert generation are provided, automatic control or adjustment of discovery signal processing and alert generation may also be implemented or the automatic control may be implemented as an alternative to the user control.

22 Claims, 8 Drawing Sheets

(56) References Cited

U.S. PATENT DOCUMENTS

| | | | |
|---|---|---|---|
| 2007/0176742 A1* | 8/2007 | Hofmann et al. | 340/7.6 |
| 2007/0287507 A1* | 12/2007 | Aton et al. | 455/567 |
| 2008/0183755 A1* | 7/2008 | Zak | 707/104.1 |
| 2008/0275808 A1* | 11/2008 | Mackay | 705/37 |
| 2009/0005010 A1* | 1/2009 | Dote et al. | 455/412.1 |
| 2009/0248828 A1* | 10/2009 | Gould et al. | 709/207 |
| 2009/0312067 A1* | 12/2009 | Ahlin | 455/567 |
| 2010/0100693 A1* | 4/2010 | Kerley et al. | 711/154 |
| 2010/0277317 A1* | 11/2010 | Putterman et al. | 340/540 |

FOREIGN PATENT DOCUMENTS

| | | |
|---|---|---|
| JP | 2001189749 A | 7/2001 |
| JP | 2003309486 A | 10/2003 |
| JP | 2009545239 A | 12/2009 |
| WO | WO-9717682 A1 | 5/1997 |
| WO | WO-2008014014 A1 | 1/2008 |
| WO | WO2008076827 | 6/2008 |

OTHER PUBLICATIONS

Taiwan Search Report—TW099105475—TIPO—Apr. 15, 2013.

* cited by examiner

| MATCHING AND/OR ALERT CATEGORY INFORMATION | | |
|---|---|---|
| INFORMATION OR INFORMATION TYPE (602) | ALERT CATEGORY (604) | WEEK DAY AND/OR TIME IN WHICH INFORMATION IS APPLICABLE (606) |
| OFFICE GROUP ID (610) | OFFICE, IMPORTANT | ANY DAY/ANY TIME |
| FAMILY MEMBER GROUP ID (612) | FAMILY | ANY DAY/ANY TIME |
| SPECIFIC USER ID 1 (E.G., ID CORRESPONDING TO A MEMBER OF SOCIAL GROUP 1 WHO IS ALSO A MEMBER OF THE OFFICE GROUP) (614) | SOCIAL GROUP 1 (E.G., SINGLES MEETING GROUP) AND OFFICE | M-F 9:00AM-5:00 PM |
| SPECIFIC USER ID 1 (616) | SOCIAL GROUP 1 | ANY DAY AFTER 5:00 PM |
| SERVICE SOLICITATION ID (618) | NONE | ANY DAY/ ANY TIME |
| PRODUCT ADVERTISEMENT (620) | PRODUCT ADVERTISEMENT | ANY DAY/ ANY TIME |
| UNRECOGNIZED ID (622) | NONE | ANY DAY/ ANY TIME |

FIGURE 6

METHODS AND APPARATUS FOR PROCESSING DISCOVERY SIGNALS AND/OR CONTROLLING ALERT GENERATION

FIELD

Various embodiments relate to wireless communications, and more particularly, to methods and apparatus for processing discovery signals and/or controlling alert generation in response to received discovery signals.

BACKGROUND

In peer-to-peer systems, devices may broadcast what are referred to as discovery signals. The discovery signals allow devices in the vicinity of one another to determine the presence of the other device and/or information that may be useful to the receiving device in determining if a connection should be established with the device transmitting a received discovery signal. Discovery signals may be transmitted to communicate, user identifiers, device identifiers, group identifiers, e.g., indicating membership in a particular group, service offers, product advertisements, requests for service, etc. A device may periodically transmit discovery signals to communicate the same or different information. The transmission of discovery signal allows devices entering an area to detect the presence of the transmitting device and to discover information about the device, services, etc. available from, or being sought by, the transmitting device.

A user of a peer-to-peer device could be overwhelmed if alerts, also sometimes referred to as alarms, were generated each time a discovery signal was received. This is particularly the case in congested areas where a large number of devices may be present and transmitting discovery signals. Problems may also occur in areas such as shopping malls where large numbers of product or service advertisements may be transmitted in an attempt to attract the attention of potential customers.

Generation of a large number of alerts in response to discovery signals in which the user is not interested can result in the user becoming disinterested in alerts. It may also cause the user of a device to ignore alerts which are important to the user as the user is overwhelmed by alerts of little or no interest to the user making the user insensitive to the large number of alerts.

The total number of alerts is not the only issue of concern. Alerts may be caused for different reasons, e.g., because of the receipt of discovery signals including different identifiers or offers. From the user's perspective, discovery signals communicating different information may have different degrees of relevance and/or importance. Accordingly, it would be desirable if the number and/or type of alerts generated in response to the receipt of discovery signals could be controlled at least in part, based on the information, e.g., identifier or offer, communicated by the discovery signal.

In view of the above discussion it should be appreciated that there is a need for improved methods and apparatus for processing discovery signals and/or controlling alert generation. In particular, there is a need for a method whereby alert signals are generated based on received discovery signals on a selective basis, e.g., so that receipt of a discovery signal does not automatically result in an alert being generated. It would be desirable if at least some methods and/or apparatus could be developed which allow for one or more of the following: at least some user control over alert generation; automatic control or adjustment of alert generation as a function of a user response to one or more generated alerts or discovery statistical information; and control over the frequency of alerts corresponding to a particular alert category or type of discovery signal.

SUMMARY

Various embodiments relate to wireless communications, and more particularly, to methods and apparatus for processing discovery signals and/or generating alerts based on received discovery signals. In at least some embodiments, alert signal generation is performed on a selective basis in response to received discovery signals. In some, but not necessarily all embodiments, some discovery signals are discarded or ignored, e.g., after a determination that the discovery signal does not communicate information relating to an alert category or relates to an alert category which is not of interest to a user of the receiving device. In at least some embodiments a user is provided at least some control over alert generation with the user being able to indicate types of signals which should not trigger generation of an alert, the minimum permitted frequency of particular alerts or types of alerts and/or time or location constraints which are considered when a device determines whether or not to generate an alert in response to one or more received discovery signals. Other criteria for alert signal generation may also be set by a user such as a number of discovery signals communicating information corresponding to an alert category which should be received prior to an alert corresponding to the category being generated. While user control of discovery signal processing and alert generation are provided in some embodiments, automatic control or adjustment of discovery signal processing and alert generation may also be implemented or the automatic control may be implemented as an alternative to the user control. In the case of automatic control, in some embodiments alert generation is controlled by the device as a function of a user response to one or more previously generated alerts. Automatic control may, and in some embodiments is, based on discovery signal statistics with the frequency and/or types of generated alerts being taken into consideration when the device automatically makes adjustments to the discovery signal processing and/or alert generation process.

While the various discovery signal processing methods and alert generation control methods may be used together, it should be appreciated that the combination of the above described signal processing and alert control generation methods is not necessary. Thus, in an individual embodiment, one or more of the above described features may be used with the complete set of features not being necessary or rent requirement.

Some exemplary embodiments are described in the context of a peer-to-peer system but the methods described herein are well suited for use with a variety of wireless communications systems, e.g., systems in which one device may detect signals transmitted by another device. Accordingly, it should be appreciated that the described methods are not limited to peer-to-peer systems.

In accordance with one exemplary aspect, an exemplary method of operating a communications device includes assigning a received wireless discovery signal to at least one alert category, and determining if an alert is to be generated based on at least one alert category. In some embodiments the method further includes deciding the type of alert to be generated based on said at least one alert category.

In accordance with one but not necessarily all aspects, a communications device includes at least one processor configured to: assign a received wireless discovery signal to at least one alert category, and determine if an alert is to be generated based on the at least one alert category. The communications device may, and in some embodiments does, include a memory coupled to said at least one processor.

While various embodiments have been discussed in the summary above, it should be appreciated that it is not necessary for all embodiments to include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 6 illustrates an exemplary set of stored information which can be used for processing discovery signals and/or determining if an alert should be generated.

DETAILED DESCRIPTION

Figure 1:
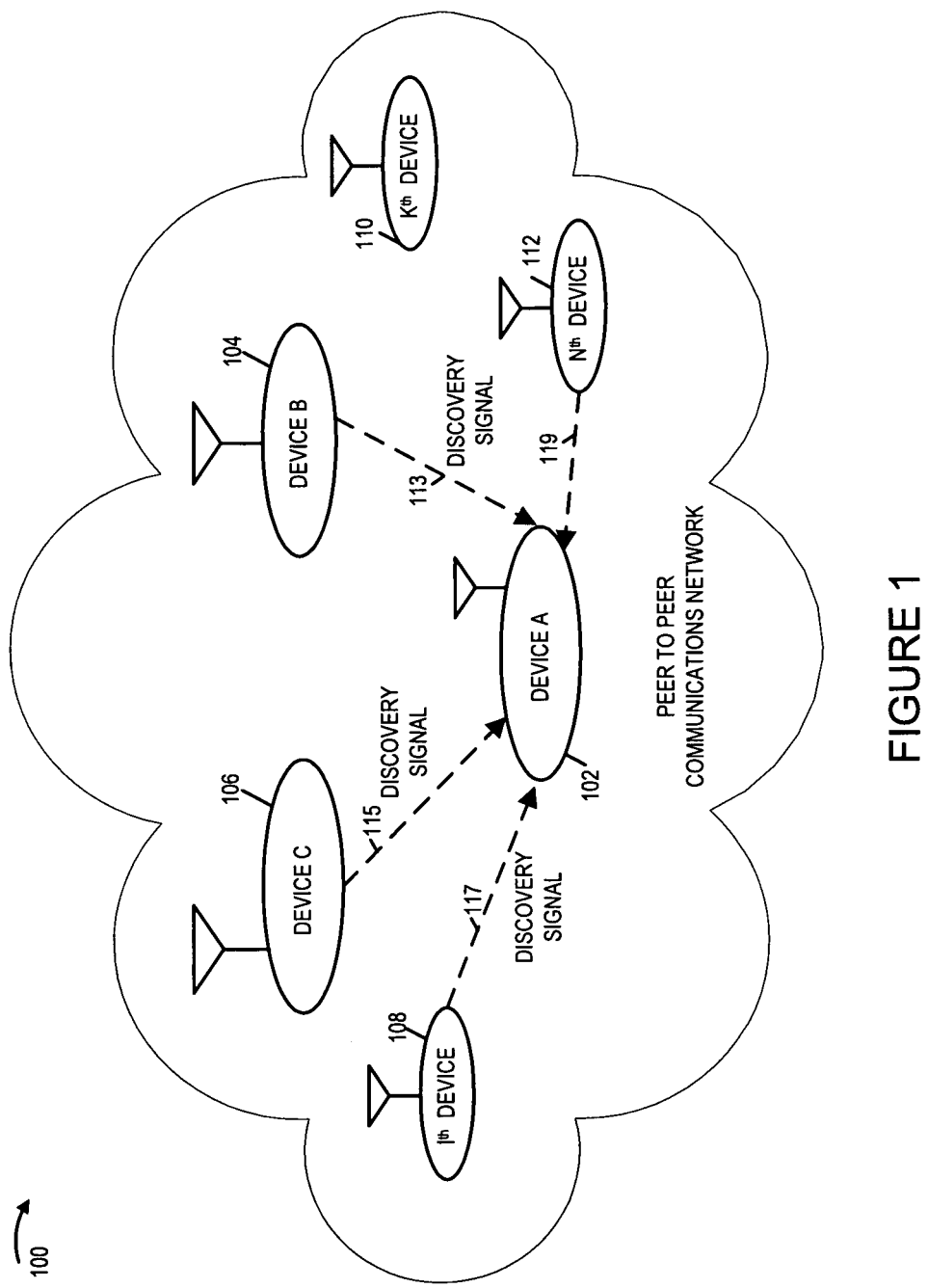
FIG. 1 illustrates an exemplary wireless communications network, in accordance with an exemplary embodiment.

FIG. 1 illustrates an exemplary wireless communications network 100, e.g., an ad hoc peer-to-peer wireless communications network, in accordance with one exemplary embodiment. Exemplary wireless communications network 100 includes a plurality of communications devices, e.g., peer-to-peer communications devices. The plurality of peer-to-peer communications devices include communications device A 102, communications device B 104, communications device C 106, in addition to $I^{th}$, $K^{th}$ and $N^{th}$ peer-to-peer communications devices 108, 110 and 112, respectively. Communications devices 102, 104, 106, 108, 110 and 112 may include or be coupled to antennas for receiving and/or sending signals, as shown in FIG. 1.

The wireless communications network 100 illustrated in FIG. 1 support mechanisms that allow communications devices of the network 100 to discover and/or detect other communications devices that are associated with, e.g., user, application, service, network, which are of interest to the monitoring communications device. As will be discussed below, the communications devices of network 100 may broadcast and receive wireless discovery signals, e.g., peer discovery signals and/or other information. Such signals may be used to facilitate discovery and connection establishment between devices. The wireless discovery signals may communicate, e.g., identification/discovery credentials of the communications device broadcasting the discovery signals.

In the FIG. 1 example, a monitoring communications device, e.g., communications device A 102, is shown receiving wireless discovery signals e.g., signals 113, 115, 117 and 119 from communications devices 104, 106, 108 and 112 respectively. The discovery signals 113, 115, 117, and 119 may be received at different times or within the same discovery interval. As devices enter or leave an area, the discovery signals that device A 102 will receive may vary. In addition the proximity of device A 102 to other devices will affect which signals are received. For example, in FIG. 1, the $K^{th}$ device 110 will transmit discovery signals but these will not be received by device A 102 assuming that device A 102 is out of range of the $K^{th}$ device 110. FIG. 1 assumes that $K^{th}$ device 110 is out of range of device A 102 and therefore the discovery signal from the $K^{th}$ device 110 is not shown as being received by device A 102. It should be appreciated that communication device A 102 may, and in some embodiments does, also advertise its discovery information, e.g., by broadcasting a discovery signal, to other communications devices.

Figure 2:
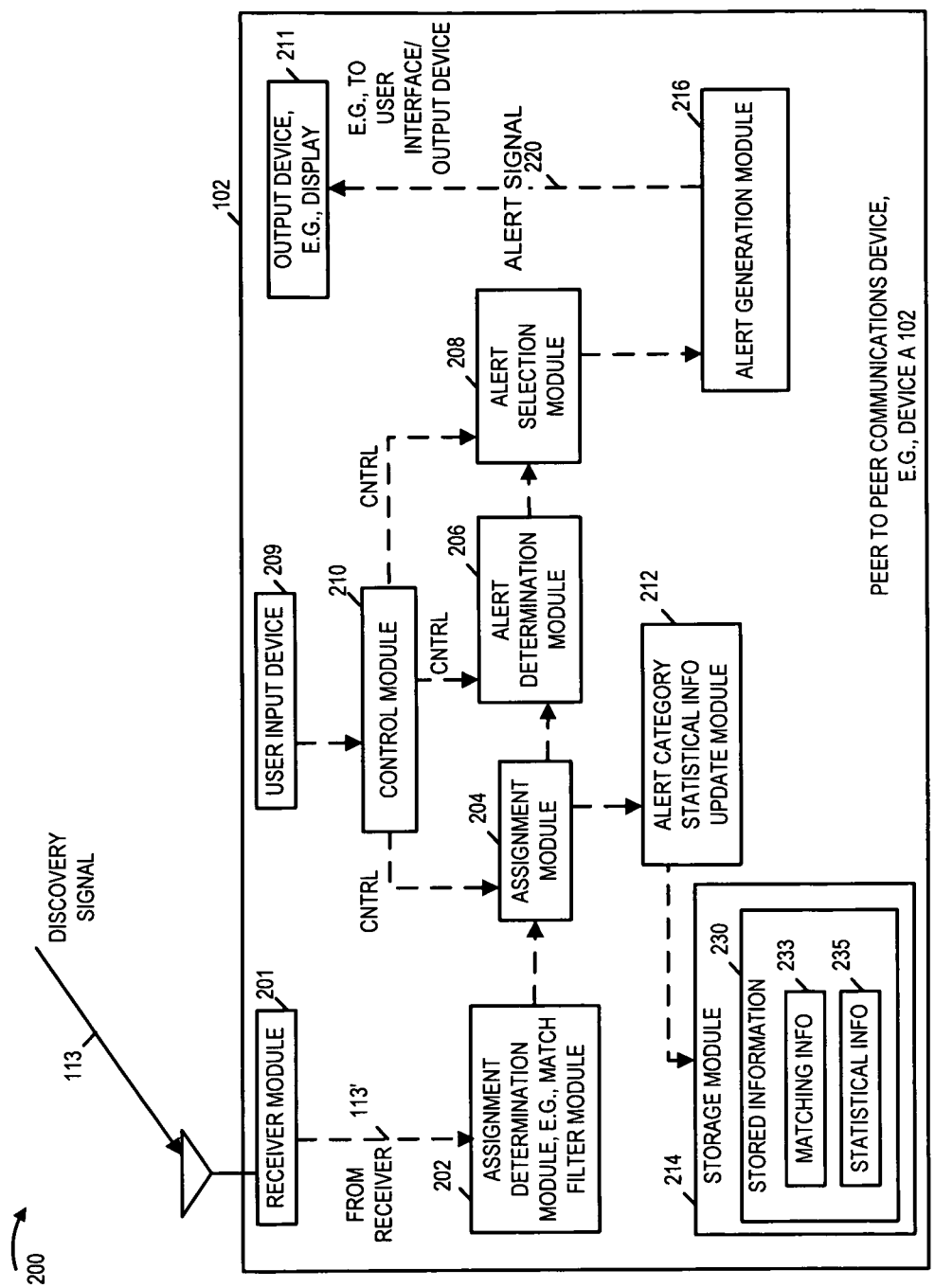
FIG. 2 is an illustration of an exemplary communications device which can be used in the system shown in FIG. 1.

FIG. 2 illustrates an exemplary communications device 200 that may be used as device A 102 or any one of the other devices shown in the system illustrated in FIG. 1. The exemplary peer-to-peer communications device 200 includes a receiver module 201 coupled to a transmitting/receiving (Tx/Rx) antenna, an assignment determination module 202, an assignment module 204, an alert determination module 206, an alert selection module 208, user input device 209, a control module 210, an output device 211, an alert category statistical information update module 212, a storage module 214 including stored information 230, and an alert generation module 216 coupled together as shown. The storage module 214 may be implemented as memory. The stored information 230 includes matching information 233 and statistical information 235. In some embodiments the modules in FIG. 2 are implemented in hardware, e.g., as circuitry. In other embodiments the modules are implemented as software or memory modules while in still other embodiments the modules are implemented as a combination of software and hardware.

For purposes of explanation it will be assumed that device 200 corresponds to device A 102 of FIG. 1, and receives and processes discovery signal 113, received from another communications device, device B 104, e.g., in the local proximity of device A 102. The signal 113 is received via the Tx/Rx antenna coupled to receiver module 201 as shown in FIG. 2 and is processed by the receiver module 201. The receiver module 201 processes the received signal 113 and passes the recovered discovery information 113' to the assignment determination module 202. The assignment determination module 202 determines if the recovered discovery information is to be assigned to an alert category or if the information 113' is, e.g, of a type which does not get assigned to an alert category. For example, in some embodiments a user may set which information or types of information are to be used in generating alerts. The user may also set specific information or types of information which are not to be considered for alert generation. The assignment determination module 202 may, and in some embodiments is, implemented using a match filter that matches some information communicated by the received discovery signal 113 to stored information 230. For example, in some embodiments the assignment determination module 202 matches the discovery credentials, e.g., identification information of the sending device included in the recovered information, communicated by the received discovery signal 113, to some information, e.g., matching information 233 previously stored in device A 102. The previously stored information may include, e.g., identification information for devices, services, networks of interest and/or other devices known to the user of device A 102 and may be used for processing the received discovery information for purposes of possible alert generation. In some embodiments if the recovered information 113' does not include at least some information matching information for which further alert processing is to be performed, processing of the recovered information 113' ends at module 202. FIG. 6 shows an example of matching information which may be stored as information 233 In some embodiments the assignment determination module 202 performs a match operation to determine if the received discovery signal 113 is to be assigned to at least one alert category. Thus in some embodiments if the discovery signal 113 is received from, e.g., a device of interest and/or a known device, then device A 102 may decide to process the received discovery signal further since the recovered information 113' includes information which may cause an alert to be generated, otherwise module 202 may decide not to process the signal further since there is no match.

Figure 7:
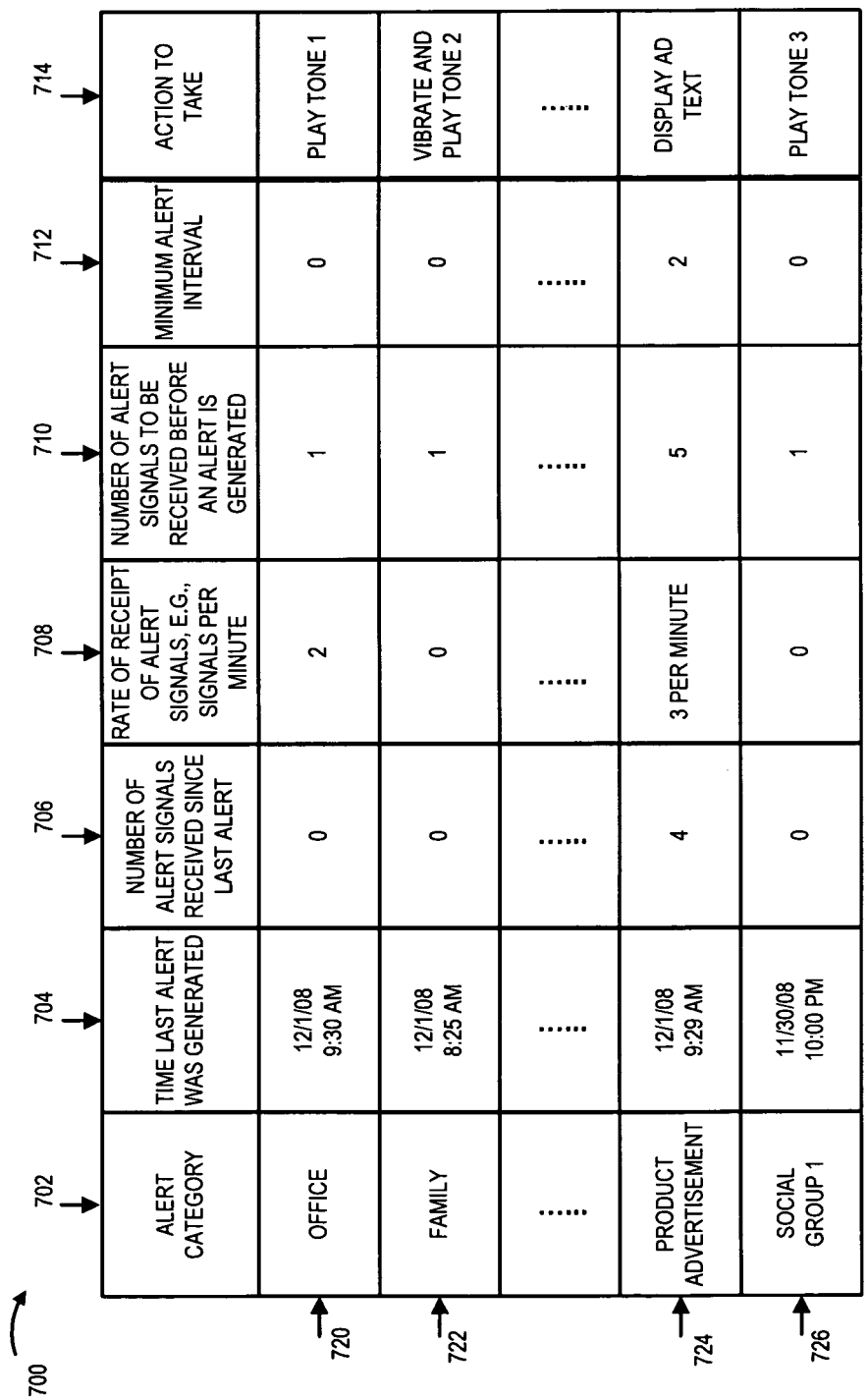
FIG. 7 illustrates another exemplary set of stored information which may be used for processing discovery signals and/or determining if an alert should be generated.

Following the determination if the received signal 113 is to be assigned to at least one alert category, the recovered information 113' is supplied to the assignment module 204. The assignment module 204 assigns the received discovery signal 113 to at least one alert category. In some embodiments, each time a discovery signal is assigned to at least one alert category, the alert category statistical information update module 212 updates alert category statistical information 235 which may, and sometimes is stored in the storage module 214. FIG. 7 shows a set of information 700 which includes exemplary alert category statistical information. FIG. 7 will be discussed further below. As will be discussed below, the statistical information 235 is used by the control module 210 in some embodiments. Following the assignment of the received discovery signal 113 to the at least one alert category, the alert determination module 206 determines if an alert is to be generated based on the at least one alert category to which the received discovery signal has been assigned. For example, it is possible that for some alert categories, the device A 102 may have been configured by the user, not to generate any alert or to generate an alert after some number of signals 113 corresponding to the particular alert category to which the signal 113 has been assigned are received, e.g., as indicated by statistical information 235. For example to avoid being overwhelmed by alerts generated from devices passing through an area, the user may set device 200 to generate an alert but only after some number, e.g., 5 signals, from the same device are received and assigned to an alert category. The user may also set the device 200 so that after an alert corresponding to a particular type of information or category is generated, another alert is not generated for that particular information type or category for a predetermined or set amount of time from the last alert for the particular information type or category. In some embodiments the alert category statistical information 235 includes the time of the last generated alert for a particular information type or category. Thus, in some embodiments, alert determination module 206 performs the determination of whether or not to generate an alert based on the at least one alert category to which the received signal has been assigned. In some embodiments, the alert determination module 206 performs the determining operation further based on at least one of time or location.

When it is determined by the alert determination module 206 that an alert is to be generated, the alert selection module 208 is provided with the recovered information and/or information on the alert category to which the signal 113 is assigned. The alert selection module 208 decides a type of alert to be generated, based on the at least one alert category to which the wireless discovery signal 113 is assigned. In accordance with an exemplary embodiment, the alert selection module 208 is capable of generating variety of different alerts, e.g., play different sounds, causing device A 102 to vibrate, cause the device A 102 to display flashing lights on the display screen etc. A different type of alert may be selected for different alert categories. A control module 210 controls one or more of the modules of device A 102 to function according to the exemplary method presented in the following section. In some embodiments the control module 210 is responsible for controlling, based on wireless discovery statistical information, at least one of the assignment module 204, alert determination module 206 or the alert selection module 208. In some embodiments the control module 210 controls, based on a user alert setting and/or the user's response to one or more previous alerts, at least one of the assignment module 204, alert determination module 206 or the alert selection module 208. For example, if a user does not take action in response to a number of alerts, e.g., a fixed predetermined number of alerts of a given type, the control module 210 decreases the number of alerts of that type by: i) increasing the number of discovery signals corresponding to the alert type required to trigger the alert generation, and/or ii) the minimum permitted time between alerts of the given alert type. As shown, the control module 210 may receive a user input 209 and accordingly control the operation of one or more of the modules 204, 206 and 208. The control mechanism will be discussed in greater detail in the following section that describes flowchart 300.

Following a decision on type of alert by the selection module 208, the alert generation module 216 generates an alert signal 220 of the decided/selected type, which is then sent to an output device 211 which may be part of a user interface. The generated alert signal 220 causes the device A 102 to perform the action corresponding to the selected alert, e.g., play a sound as indicated by the alert signal 220, or for example cause the device A 102 to vibrate if the decided type of alert is a vibration, and/or take any other action as indicated by the alert signal 220.

Figures 3, 3A, 3B:
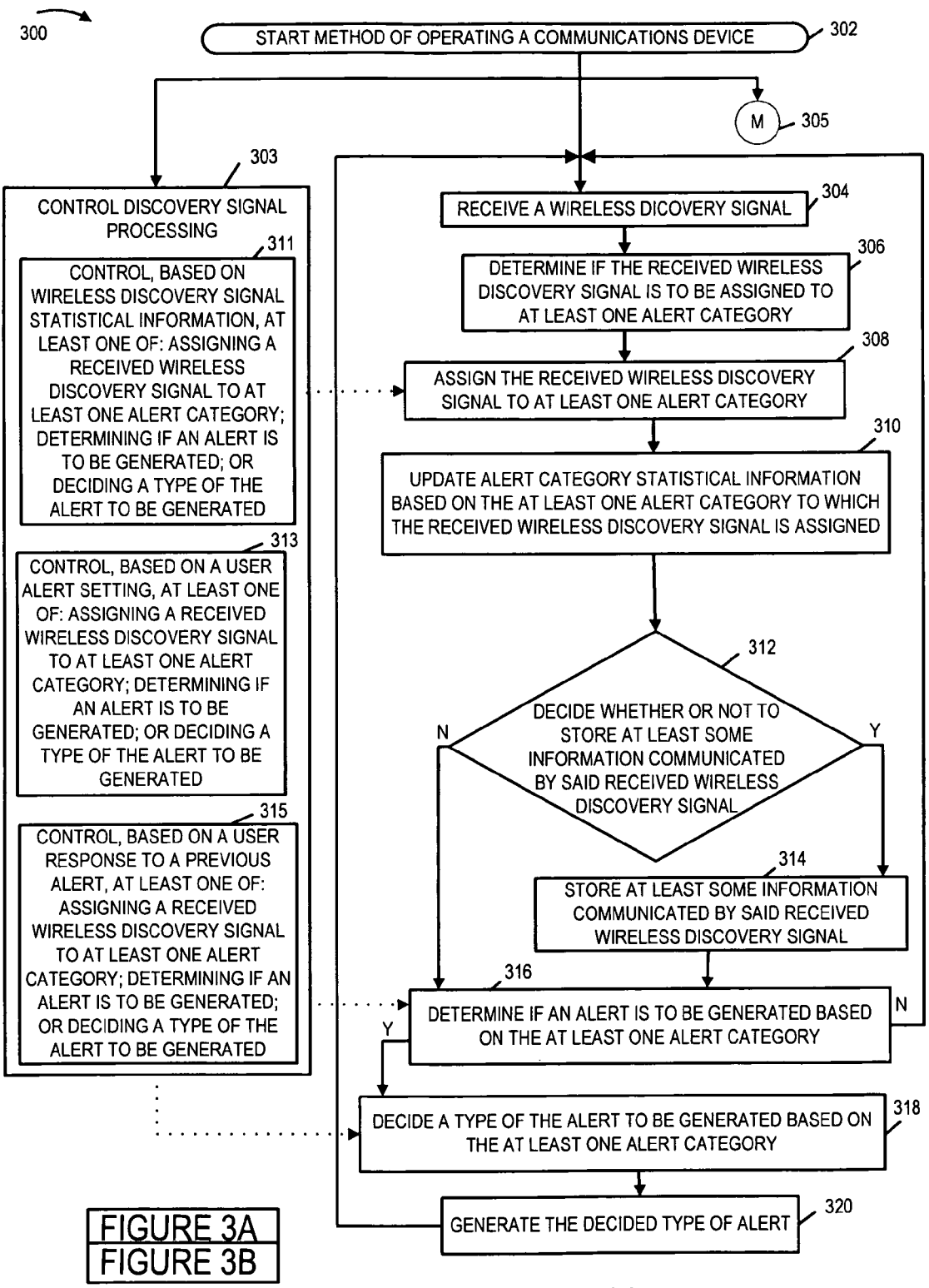
FIG. 3A is a first part of a flowchart showing the steps of an exemplary method of operating a communications device, in accordance with one exemplary embodiment.
FIG. 3B illustrates a second part of the exemplary method of FIG. 3A and in combination with FIG. 3A comprises FIG. 3.
Figure 3B:
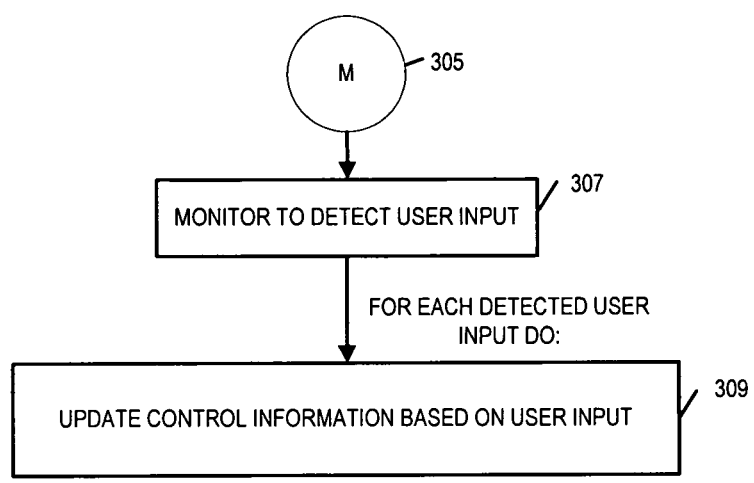

While an exemplary embodiment has been used to describe various features, the method used in some embodiments will become even clearer when considered in view of the flow chart shown in FIG. 3.

FIG. 3, which comprises the combination of FIGS. 3A and 3B, is a flowchart 300 showing the steps of an exemplary method of operating a communications device, e.g., a device receiving one or more wireless discovery signals, in accordance with an exemplary embodiment. The communications device can be, e.g., the peer-to-peer communications device A 102 shown in FIG. 1.

As shown in FIG. 3A, operation starts in step 302 where the communications device A 102 is powered on and initialized. The operation proceeds from start step 302 to step 304. In some embodiments the operation also proceeds from step 302 to steps 303 and 307 which may but need not be, performed in parallel with the processing which starts with step 304. The progression from step 302 to step 307 shown in FIG. 3B is via connecting node M 305. Steps 303, 304 and steps associated with connecting node M 305 may be performed in parallel.

In step 304 the communications device A 102 receives a wireless discovery signal, e.g., such as discovery signal 113, from another communications device. In some embodiments the discovery signal 113 may be a discovery advertisement, e.g., including discovery credentials and/or other information associated with the advertising device. The discovery signal may communicate a device, user and/or group identifier. It might alternatively or in addition indicate that the discovery signal is a request for a service or an advertisement for a service. The operation proceeds from step 304 to step 306. In step 306 the communications device A 102 determines if the received wireless discovery signal is to be assigned to at least one alert category. For example, in some embodiments device A 102 may compare the information included in the discovery signal, e.g., identification information of the sending device, with information previously stored in device A 102, e.g., previously stored matching information which can be used to match signal information to an alert category or which can be used to determine that there is no matching alert category and that the signal should not be assigned to an alert category. The previously stored information may include, e.g., identification information of devices, services, networks of interest and/or other devices known to the user of device A 102. The devices which may be known to the user of device A 102 may include, for example, colleagues, family members, club friends, gym friends etc. In accordance with one exemplary embodiment, as a part of step 306, device A 102 matches at least some information included in the received discovery signal with stored information.

Referring now briefly to FIG. 6, it can be seen that FIG. 6 illustrates an exemplary set of stored information 600. The stored information 600 can be used for determining if an alert is to be generated and can also be used for determining a category to which an alert corresponds. The set of stored information 600 is shown in the form of a table. The first column 602 includes information, e.g., an identifier, or an information type indicator which can be used to match a received signal to a particular row of information for purposes of making an alert generation determination and/or an alert category assignment determination. The second column 604 is an alert category column indicating the alert category to which the information in a given row corresponds. The third column 606 lists the day/times when the alert category information for the given row is applicable. Depending on the time a discovery signal is received, based on the information in column 606, the discovery signal may be assigned one or another alert category depending on which row of information is valid at the time the signal is received. Consider for example exemplary rows 610, 612, 614, 616, 618, 620, and 622. The first row 610 shows that a signal including an office group ID will be assigned to the alert category "OFFICE" and also to the alert category "IMPORTANT" any day and/or time a discovery signal communicating an office group ID is received. The second row 612 indicates that a signal communicating a family member group ID will be assigned to the alert category "FAMILY" whenever it is received. The third row 614 shows that when a signal received during the Monday to Friday 9 AM to 5 PM time period is received, which communicates a user ID 1 corresponding to a specific individual who is both a member of Social Group 1, e.g., a singles meeting group, and the Office group, the signal will be assigned to two alert categories, a Social Group 1 alert category and the OFFICE alert category. However, as shown in row 616 if a signal communicating user ID 1 is received outside of business hours, e.g., any day after 5 P.M., Saturday or Sunday, the signal will be assigned just to the Social Group 1 category, e.g., because the OFFICE Alert category is not relevant outside of work hours in this example with regard to the user to whom USER ID 1 corresponds. While some rows in the information table 600 correspond to specific identifiers, other rows correspond to types of information which may be identified based on their identifier. For example, row 618 corresponds to signals which communicate service solicitation identifiers. In this example, the user has set a preference that he does not want alerts to be generated in response to service solicitations and therefore there is no alert category for service solicitation signals to be assigned to as indicated by the "NONE" indicator listed in the alert category of row 618. As indicated by the applicable day/time information for row 618 the "None" alert category indicator is applicable for all days/times. While the user of the device has indicated that service solicitations are not to trigger alerts, this is not the case with product advertisements as shown in row 620. Signals conveying information indicating that the signal communicates product advertisement information, e.g., as may be indicated by a product advertisement ID being communicated in the signal, are assigned to the PRODUCT ADVERTISEMENT alert category. In row 622, it can be seen that the device is configured not to assign or generate alerts for signals which do not include a recognized identifier, e.g., an identifier which can be matched to a valid alert category. This may be a user modifiable setting just as the other information in the table 600 may be modified by the user of the device.

If the discovery signal is received from, e.g., a device of interest, known device, or communicates information of interest to the receiving device A 102, then device A 102 may determine that the signal is to be assigned to an alert category and processed further. However if the received signal is one which is not to be assigned to an alert category, e.g., with the alert category corresponding to the received signal being indicated as "NONE", the signal is not processed further. If the signal is a duplicate or communicates duplicate information to a previously received discovery signal, e.g., for which the received information was stored, the received signal may also be discarded in some but not necessarily all embodiments.

Operation proceeds from step 306 to step 308 in cases where the received signal is to be assigned to an alert category. In step 308 device A 102 assigns the received wireless discovery signal to at least one alert category, e.g., a category or categories indicated in table 600. In some embodiments there may be multiple alert categories to which different received discovery signal can be assigned. In some embodiments, different alert categories may be based on a level of priority which the user of device A 102 may set. For example, alert categories may be categorized as "Important", "Unexpected", "Low Priority", "Insignificant". Other examples of alert categories include: OFFICE, FAMILY, SOCIAL GROUP 1, PRODUCT ADVERTISEMENT, etc. some of which are shown in table 600. It should be appreciated that although the alert categories may not change, the assignment of different discovery signals to the different alert categories may change, e.g., based on time and/or location of the receiving device and/or based on, e.g., a user input. In at least some embodiments the assigning operation of step 306 is based on at least one of time (e.g., time of processing or signal receipt) or location (e.g., location of the receiving device). Thus, based on, e.g., time and/or location, the communications device may assign a received discovery signal to an alert category at a given time. The receiving device A 102 may, and in some embodiments does, know its location based on a GPS signal or other signal received by the device. To facilitate device determination the device A 102 may include a position determination module, e.g., a GPS receiver module in addition to various other components. It should be appreciated that a received signal may be assigned to multiple different alert categories, e.g., at different times and/or different locations. Furthermore, as will be discussed in the control step 303, assigning of received discovery signal may also be controlled based on discovery signal statistical information, e.g., discovery signal detection rate, based on user alert setting and/or based on user's response to a previous alert. Operation proceeds from step 308 to step 310.

In step 310, device A 102 updates alert category statistical information based on the at least one alert category to which the received wireless discovery signal is assigned. Thus, once device A 102 assigns the received discovery signal to an alert category where it belongs, device A 102 updates information on the receipt and assignment of discovery signals to alert categories. The information may include information about the time of the signal receipt as well as other information. The statistical alert information may be stored in a set of information such as that shown in FIG. 7. The FIG. 7 information which may be stored in memory may include alert handling information in addition to the statistical information on received alert signals.

Referring now briefly to FIG. 7, illustrated is a set 700 of information. The information 700 is presented in the form of a table and includes alert statistical information, alert setting information and alert action information. In the FIG. 7 set of information, each row corresponds to a different alert category. Row 720 corresponds to an office alert, row 722 corresponds to a family alert, row 724 corresponds to a product advertisement alert while row 726 corresponds to a social group 1 alert. The first column 702 in the set of information 700 includes the alert category entries, one for each row, which can be used to determine the row to be accessed/updated in response to a signal determined to correspond to the identified alert category corresponding to a row. Entries in the second column 704 indicate the last time an alert was generated for the corresponding row. This is useful when determining whether or not an alert should be generated and there is a minimum time between alerts set for an alert category. Entries in the third column 706 indicates the number of alert signals received since the last alert for the given category corresponding to one of the rows 720, 722, 724, 726 was generated. Entries in the fourth column 708 indicate a rate of receipt of alert signals, e.g., in alert signals per minute, for the corresponding alert category. Entries in the fourth column 708 can be used by the control module to determine if the number of signals of a particular category required to be received should be increased before a corresponding alert is generated, e.g., because of signals being received at a high or excessive rate. Entries in the fifth column 710 indicate the number of alert signals of a particular alert category to which the individual entry corresponds, before an alert is generated. This information can be used in combination with the information in the third column to determine if an alarm is to be generated in response to receipt of a signal corresponding to a particular alert category. Entries in sixth column 712 indicate the minimum interval between alerts which is to be required before an alarm is generated for an alert to which the indicated interval corresponds. This information with information from the second column 704, can be used to determine if an alarm should not be generated in response to a received signal corresponding to an alert category because the current time is within the minimum interval from the time of the last alarm generated for the alert category to which the received signal corresponds. The information in columns 710, 712 may be set by the user and/or automatically modified by the control module based on user responses to alarms generated in response to signals corresponding to a particular alert category. For example, the control module may increase the minimum time between alerts for an alert category or increase the number of signals corresponding to a particular alert category which are to be received prior to generating an alert corresponding to the particular alert category, e.g., when a user disregards or silences one or more alerts corresponding to a particular alert category.

While much of the information stored in the information set 700 relates to information about past alarms and received signals, the seventh column 714 includes entries which indicate what type of alert should be generated when it is determined that an alert for a particular alert category should be generated, for example, when an alert corresponding to an office alert category is to be generated, tone 1 will be played, when an alert corresponding to a family alert category is to be generated, the device will be controlled to both vibrate and play tone 2. The same or different alarm actions may be indicated for alerts corresponding to different alert categories.

The alert category statistical information, e.g., one or more columns of information shown in Figure 700, may be, and in some embodiments is, stored in memory device A 102 and is refreshed, e.g., each time a discovery signal is assigned to an alert category. In some embodiments, device A 102 may use the alert category statistical information to make intelligent decisions regarding alert generation and/or alert filtering.

Operation proceeds from step 310 to step 312 wherein the device A 102 decides whether or not to store at least some information communicated by the received discovery signal. The information communicated by the received discovery signal may include, e.g., identification information of the sending device, and/or for example information about a service, application, network associated with the sending device. It is possible that device A 102 that received the discovery signal 113 may know from an identifier in the discovery information that the information is not of interest and should therefore be discarded. Thus in such a scenario device A 102 may decide not to store the communicated information. In another aspect, the discovery signal may also include some information in addition to an ID which is of interest to device A 102, e.g., additional information about a service or application, in which the user of the receiving device A 102 may be interested. Thus, in such a scenario, device A 102 may decide to store at least some information communicated by the discovery signal, e.g., for future use, should the user respond to an alert generated in response to the discovery signal. Thus when it is decided to store some of the communicated information, the operation proceeds from step 312 to step 314 wherein device A 102 stores, e.g., in memory, at least some information communicated by the received discovery signal. In cases where it is decided not to store information, e.g., because the information is not likely to be needed even if the user responds to an alert generated in response to the discovery signal, the operation proceeds directly from step 312 to step 316.

In step 316, device A 102 determines if an alert is to be generated based on the at least one alert category to which the received discovery signal was assigned in step 308. In some embodiments, said determining is further based on at least one of time or location. The time may be, the time of discovery signal receipt or the time difference between the receipt of the discovery signal and last alert generated for the alert category to which the discovery signal has been assigned. The location may be, e.g., location of the receiving device A 102. In some embodiments device A 102 may determine if an alert should be generated, by checking e.g., a user setting, for the at least one alert category to which the discovery signal is assigned. For example, if device A 102 assigned the received discovery signal to, e.g., "Important" alert category, and a user setting indicates that user should be alerted when a signal is assigned to the "Important" category, then device A 102 may conclude that an alert should be generated. Information included in the set of information 700 may be used in determining whether or not to generate an alert as discussed above. If it is determined that an alert is to be generated, the operation proceeds from step 316 to step 318. However, if it is determined that no alert is to be generated the operation proceeds from step 316 back to step 304.

In step 318, the communications device A 102 decides a type of alert to be generated, e.g., where the type of alert may be the same as the type of action to be taken, based on the at least one alert category. For example a vibrate alert type, tone alert type, etc. may be supported. Thus, in accordance with one exemplary embodiment, different types of alerts can be generated by device A 102, e.g., based on the alert category to which the received discovery signal is assigned. Different type of alerts may include, e.g., a specific type ringtone, a beep, a vibration, a flashing display on the device screen, etc and/or a combination thereof. For example, in one embodiment the user may program the device A 102 so that when a discovery signal is assigned to, e.g., "Important" category and it is determined that an alert is to be generated, then a vibration alert should be generated. In some other embodiments, for example, a ringtone is played as an alert, based on the at least one alert category. Thus, in general, the deciding step may include deciding from a number of available options, e.g., based on a user setting. The operation proceeds from step 318 to step 320 wherein an alert of the decided type is generated and thus the user is notified. The operation proceeds from step 320 back to step 304 for receipt and processing of additional discovery signals.

Returning to step 303. In step 303 the discovery signal processing is controlled, e.g., in response to changes in wireless discovery signal statistical information, user settings, and/or other factors. The control operation performed in step 303 may occur automatically or in response to user input. One or more of the control sub-steps 311, 313 and 315 may be implemented in any given embodiment. In step 311, communications device A 102 controls, based on wireless discovery signal statistical information, at least one of the assigning a received wireless discovery signal to at least one alert category, e.g., as done in step 308, determining if an alert is to be generated, e.g., as done in step 316, or deciding a type of alert to be generated, e.g., as done in step 318. The wireless discovery signal statistical information may include, e.g., rate of detection of a particular discovery signal discovery signals corresponding to a particular alert category. Thus, the processing of a received discovery signal can be controlled based on how frequently such discovery signals are received by the receiving device A 102, and accordingly one or more of the steps of assigning, determining and deciding may be performed. For example, if a discovery signal is detected more than a certain number of times during a period of time, the control mechanism may control the device A 102 to perform one or more of the assigning, determining or the deciding steps, in a different way. The wireless discovery signal statistical information may include, e.g., typical time and/or location for a particular discovery signal or discovery signals corresponding to a particular alert category. Thus, the processing of a received discovery signal can be controlled based on how the received discovery signal compares with what is typical for such discovery signals received by the receiving device A 102, and accordingly one or more of the steps of assigning, determining and deciding may be performed. For example, if a discovery signal is detected outside of a region and/or time period considered typical, the control mechanism may control the device A 102 to perform one or more of the assigning, determining, or the deciding steps, in a different way. In sub-step 313 communications device A 102 controls, based on a user alert setting, at least one of the assigning of the received wireless discovery signal to at least one alert category, said determining, or deciding a type of alert to be generated. As discussed in some examples earlier, the steps of assigning, determining or deciding are sometimes performed based on the configuration settings and/or some provisioning done by the user of device A 102. Thus in at least some embodiments the device A 102 uses a user setting, to control at least one of the assigning, determining or deciding. In some embodiments, an application and/or user can control the filtering of alerts, e.g., via a configuration setting, switch or knob, e.g., used to change the number of signals required before an alert is generated for an alert category or to modify the minimum time between alerts. In some embodiments, changing a user setting changes one or more of an alert frequency limit, set of alert categories and/or priorities that are suppressed, changes the geographic region and/or timing that prescribes normal versus unexpected proximity detection criteria.

Control based on user responses is also supported as shown in sub-step 315 wherein communications device A 102 controls, based on a user response to previous alert, at least one of the assigning of the received wireless discovery signal to at least one alert category, said determining, or deciding a type of alert to be generated. Thus, in some embodiments, one or more of the above mentioned steps are controlled based on, e.g., operational feedback and/or behavior of the user in response to a previous alert. Thus, it should be appreciated in accordance with one aspect, communications device A 102 implementing the method of flowchart 300 is capable of adaptively learning over the course of operation, how to filter out inconsequential alerts and accordingly modify the mechanism controlling the assigning, determining, or deciding, based on this adaptive learning to generate alerts which are likely to be responded to while reducing or eliminating alerts a user ignores or silences.

As discussed above, operation may proceed in parallel to steps 303 and 304 to step 307 with each of these steps operating, optionally, in an asynchronous manner. In step 307, device A 102 monitors to detect user input. The user input may be, e.g., a new user alert setting and/or a modification of one or more alert settings previously made by the user and/or response to an alert. For each detected user input, the operation proceeds from step 307 to step 309. In step 309, communications device A 102 updates control information based on the user input, e.g., one or more of the control parameters listed in information set 700 such as a minimum time between alerts corresponding to a particular alert category. The control information may include, e.g., location, time, alert category statistical information etc. The updated control information may be used in the discovery signal processing control step 303.

Figure 4:
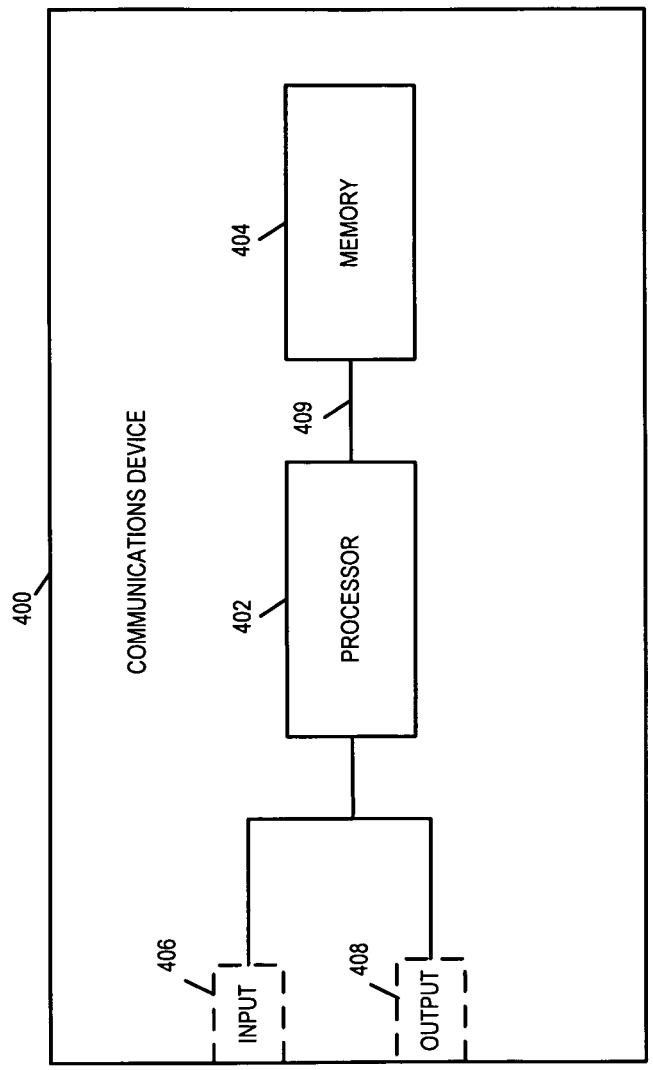
FIG. 4 shows another exemplary communications device which can be used in the system of FIG. 1.

FIG. 4 is a drawing of an exemplary communications device 400 in accordance with one exemplary embodiment. Communications device 400 maybe, and in at least one embodiment is, a mobile wireless terminal supporting peer-to-peer communications and implementing a method in accordance with flowchart 300 of FIG. 3. The communications device 400 may be used as the communication device A 102 of FIG. 1. Communications device 400 includes a processor 402 and memory 404 coupled together via a bus 409 over which the various elements (402, 404) may interchange data and information. Communications device 400 further includes an input module 406 and an output module 408 which may be coupled to the processor 402 as shown. However, in some embodiments the input module and output module 406, 408 are located internal to the processor 402. Input module 406 can receive input signals. Input module 406 can, and in some embodiments does, include a wireless receiver and/or a wired or optical input interface for receiving input. Output module 408 may include, and in some embodiments does include, a wireless transmitter and/or a wired or optical output interface for transmitting output. Processor 402, in some embodiments, is configured to: assign a received wireless discovery signal to at least one alert category, and determine if an alert is to be generated based on the at least one alert category to which the received wireless discovery signal is assigned. In some embodiments, the processor 402 is configured to assign the received wireless discovery signal to the at least one alert category based on at least one of time or location. In at least some embodiment the processor 402 is further configured to determine if an alert is to be generated based on at least one of time or location.

The processor 402 may and in some embodiments is, further configured to decide a type of alert to be generated based on the at least one alert category to which the received wireless discovery signal is assigned. In some embodiments the processor 402 is further configured to control, based on wireless discovery signal statistical information, at least one of said assigning, said determining if an alert is to be generated, and said deciding the type of alert to be generated. In at least some embodiments, the processor 402 is further configured to control, based on a user alert setting, at least one of said assigning, said determining and said deciding.

In some embodiments, the processor 402 is further configured to update alert category statistical information based on the at least one alert category to which the received wireless discovery signal is assigned. In some embodiments, the processor 402 is further configured to decide whether or not to store at least some information communicated by said received wireless discovery signal. In some embodiments, the processor 402 is further configured to determine, prior to assigning, if the received wireless discovery signal is to be assigned to at least one alert category. The processor 402 is configured, in some embodiments, to perform at least one of the assigning, determining if an alert is to be generated, or deciding a type of alert to be generated, based on a user's response to a previous alert.

Figure 5:
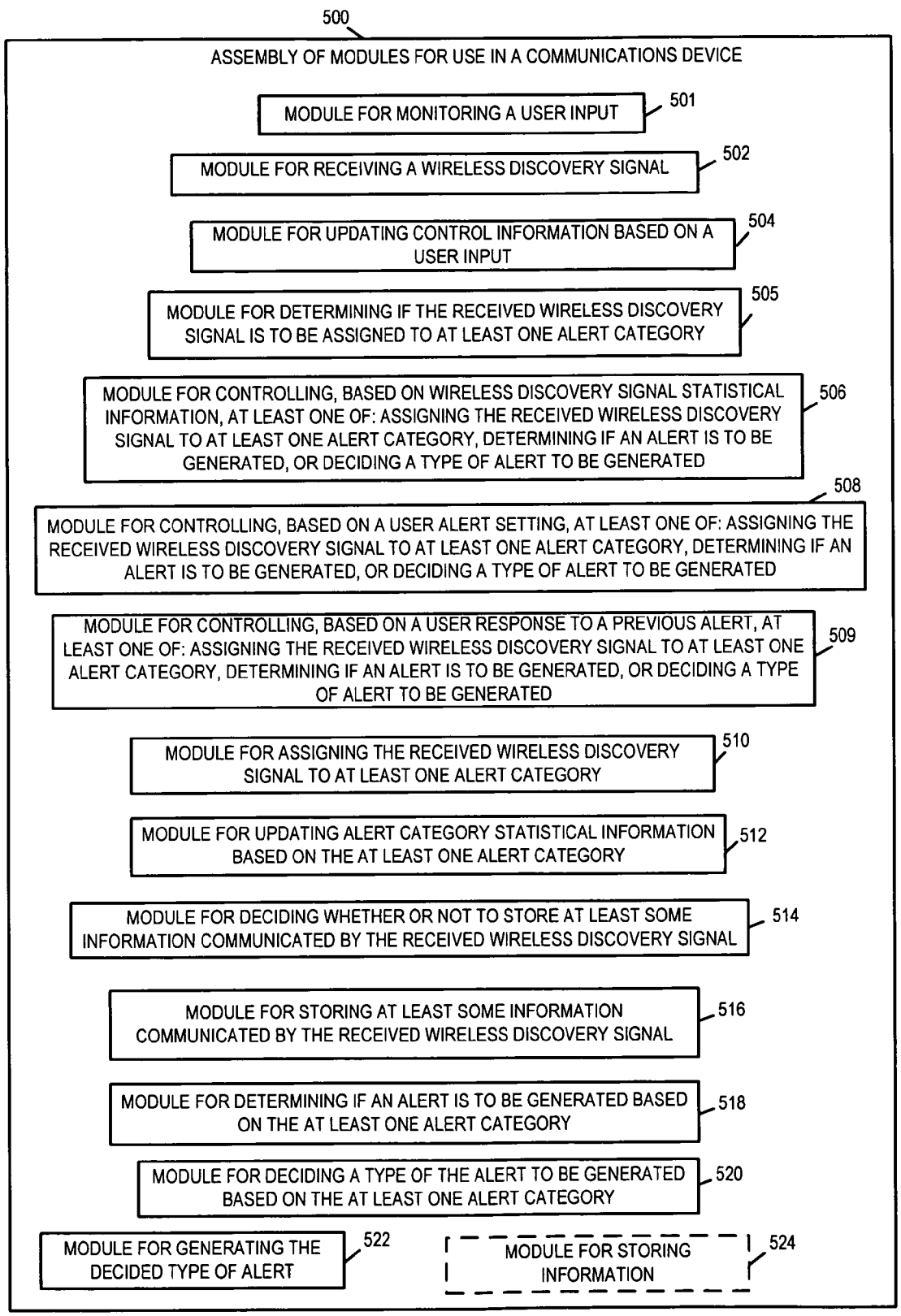
FIG. 5 illustrates an assembly of modules which can be used in the exemplary communications device of FIG. 4.

FIG. 5 is an assembly of modules 500 which can, and in some embodiments are, used in the communications device illustrated in FIG. 4. The modules in the assembly 500 can be implemented in hardware within the processor 402 of FIG. 4, e.g., as individual circuits. Alternatively, the modules may be implemented in software and stored in the memory 404 of the communications device 400 shown in FIG. 4. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor to implement the function corresponding to the module. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the communications device 400 or elements therein such as the processor 402, to perform the functions of the corresponding steps illustrated in the method flow chart 300 of FIG. 3.

As illustrated in FIG. 5, the assembly of modules 500 includes a module 501 for monitoring and detecting a user input, a module 502 for receiving a wireless discovery signal, a module 504 for updating control information based on user input, a module 505 for determining if the received wireless discovery signal is to be assigned to at least one alert category, a module 506 for controlling, based on wireless discovery signal statistical information, e.g., discovery signal detection rate, at least one of: assigning the received wireless discovery signal to at least one category, determining if an alert is to be generated, or deciding a type of alert to be generated. The assembly of modules 500 further includes a module 508 for controlling, based on a user alert setting, at least one of: the assigning, determining if an alert is to be generated, or deciding a type of alert to be generated, a module 509 for controlling, based on user response to a previous alert, at least one of: the assigning, determining if an alert is to be generated, or deciding a type of alert to be generated, a module 510 for assigning the received wireless discovery signal to at least one alert category, a module 512 for updating alert category statistical information based on the at least one alert category, a module 514 for deciding whether or not to store at least some information communicated by the received wireless discovery signal, a module 516 for storing at least some information communicated by the received wireless discovery signal.

In some embodiments, the assembly of modules 500 further includes a module 518 for determining if an alert is to be generated based on at least one alert category to which the received wireless discovery signal is assigned, a module 520 for deciding a type of alert to be generated based on the at least one alert category, and a module 522 for generating the decided type of alert. Among the assembly modules 500 may be a storage module 524 for storing information, e.g., the set of information 600 shown in FIG. 6 and/or the set of information 700 shown in FIG. 7.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations, communications devices and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Some embodiments are directed to a computer program product comprising a computer-readable medium, e.g., a physical medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

The P2P spectrum may use Orthogonal Frequency Division Multiplexing (OFDM) signals. However, it should be appreciated that at least some of the methods and apparatus of various embodiments are applicable to a wide range of communications systems including many non-OFDM and/or non-cellular systems such as CDMA systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In various embodiments the peer-to-peer communications devices are implemented as notebook computers, personal data assistants (PDAs), or other portable devices including receiver/transmitter circuits and logic and/or routines, for implementing the methods.

What is claimed is:

1. A method of operating a communications device, the method comprising:
   assigning a received wireless discovery signal to at least one alert category based on at least one of a time at which the wireless discovery signal is received or a location of the communications device;
   determining an information type indicator of a plurality of information type indicators for the received wireless discovery signal, the plurality of information type indicators including a predetermined information type indicator and an unknown information type indicator, the predetermined information type indicator being associated with zero or more alert categories and the unknown information type indicator being associated with no alert categories;
   determining whether the received wireless discovery signal matches with an alert category associated with the determined information type indicator;
   determining whether to generate an alert for the received wireless discovery signal based on the at least one alert category and based on wireless discovery signal statistical information associated with the received wireless discovery signal; and
   refraining from generating the alert upon a determination not to generate the alert,
   wherein the determining if the alert is to be generated for the received wireless discovery signal comprises determining to generate the alert when the received wireless discovery signal matches with an alert category associated with the determined information type indicator and determining not to generate the alert when the received wireless discovery signal does not match with an alert category associated with the determined information type indicator.

2. The method of claim 1, further comprising:
   deciding a type of the alert to be generated based on said at least one alert category upon a determination to generate the alert.

3. The method of claim 2, further comprising:
   controlling, based on the wireless discovery signal statistical information, at least one of said assigning or said deciding.

4. The method of claim 2, further comprising:
   controlling, based on a user alert setting, at least one of said assigning, said determining, or said deciding.

5. The method of claim 1, wherein said determining is further based on at least one of time or location.

6. The method of claim 1, further comprising determining whether the received wireless discovery signal matches with any of a plurality of alert categories, wherein the received wireless discovery signal is assigned to the at least one alert category of the plurality of alert categories only if the received wireless discovery signal is determined to match with the at least one alert category.

7. The method of claim 1, wherein the determining to generate the alert further comprises determining to generate the alert based on one or more time requirements.

8. The method of claim 1, wherein the determining to generate the alert further comprises determining to generate the alert based on one or more previously received wireless discovery signals.

9. The method of claim 8, wherein the determining to generate the alert based on the one or more previously received wireless discovery signals is based on at least one of a number of the one or more previously received wireless discovery signals and the received wireless discovery signal or a rate of receipt of the one or more previously received wireless discovery signals and the received wireless discovery signal.

10. A communications device, comprising:
at least one processor configured to:
assign a received wireless discovery signal to at least one alert category based on at least one of a time at which the wireless discovery signal is received or a location of the communications device;
determine an information type indicator of a plurality of information type indicators for the received wireless discovery signal, the plurality of information type indicators including a predetermined information type indicator and an unknown information type indicator, the predetermined information type indicator being associated with zero or more alert categories and the unknown information type indicator being associated with no alert categories;
determine whether the received wireless discovery signal matches with an alert category associated with the determined information type indicator;
determine whether to generate an alert for the received wireless discovery signal based on the at least one alert category and based on wireless discovery signal statistical information associated with the received wireless discovery signal; and
refrain from generating the alert upon a determination not to generate the alert,
wherein the determine if the alert is to be generated for the received wireless discovery signal comprises determine to generate the alert when the received wireless discovery signal matches with an alert category associated with the determined information type indicator and determine not to generate the alert when the received wireless discovery signal does not match with an alert category associated with the determined information type indicator; and
a memory coupled to the at least one processor.

11. The communications device of claim 10, wherein said at least one processor is further configured to:
decide a type of the alert to be generated based on said at least one alert category upon a determination to generate the alert.

12. The communications device of claim 11, wherein the at least one processor is further configured to:
control, based on the wireless discovery signal statistical information, at least one of said assigning or said deciding.

13. The communications device of claim 11, wherein the at least one processor is further configured to:
control, based on a user alert setting, at least one of said assigning, said determining, or said deciding.

14. The communications device of claim 10, wherein said processor is further configured to:
use at least one of time and location as part of determining if an alert is to be generated.

15. A communications device, comprising:
means for assigning a received wireless discovery signal to at least one alert category based on at least one of a time at which the wireless discovery signal is received or a location of the communications device;
means for determining an information type indicator of a plurality of information type indicators for the received wireless discovery signal, the plurality of information type indicators including a predetermined information type indicator and an unknown information type indicator, the predetermined information type indicator being associated with zero or more alert categories and the unknown information type indicator being associated with no alert categories;
means for determining whether the received wireless discovery signal matches with an alert category associated with the determined information type indicator
means for determining whether to generate an alert for the received wireless discovery signal based on the at least one alert category and based on wireless discovery signal statistical information associated with the received wireless discovery signal; and
means for refraining from generating the alert upon a determination not to generate the alert,
wherein the means for determining if the alert is to be generated for the received wireless discovery signal is configured to determine to generate the alert when the received wireless discovery signal matches with an alert category associated with the determined information type indicator and to determine not to generate the alert when the received wireless discovery signal does not match with an alert category associated with the determined information type indicator.

16. The communications device of claim 15, further comprising:
means for deciding a type of the alert to be generated based on said at least one alert category upon a determination to generate the alert.

17. The communications device of claim 16, further comprising:
means for controlling, based on the wireless discovery signal statistical information, at least one of said means for assigning or said means for deciding.

18. The communications device of claim 16, further comprising:
means for controlling, based on a user alert setting, at least one of said means for assigning, said means for determining, or said means for deciding.

19. A computer program product in a communications device, comprising:
a non-transitory computer readable medium comprising:
code for causing at least one computer to assign a received wireless discovery signal to at least one alert category based on at least one of a time at which the wireless discovery signal is received or a location of the communications device;
code for causing at least one computer to determine an information type indicator of a plurality of information type indicators for the received wireless discovery signal, the plurality of information type indicators including a predetermined information type indicator and an unknown information type indicator, the predetermined information type indicator being associated with zero or more alert categories and the unknown information type indicator being associated with no alert categories;
code for causing at least one computer to determine whether the received wireless discovery signal matches with an alert category associated with the determined information type indicator;
code for causing the at least one computer to determine whether to generate an alert for the received wireless discovery signal based on the at least one alert category and based on wireless discovery signal statistical information associated with the received wireless discovery signal; and code for causing the at least one computer to refrain from generating the alert upon a determination not to generate the alert, wherein the code for causing the at least one computer to determine if the alert is to be generated for the received wireless discovery signal comprises code for causing the at least one computer to determine to generate the alert when the received wireless discovery signal matches with an alert category associated with the determined information type indicator and to determine not to generate the alert when the received wireless discovery signal does not match with an alert category associated with the determined information type indicator.

20. The computer program product of claim 19, wherein said computer readable medium further comprises:

code for causing the at least one computer to decide a type of the alert to be generated based on said at least one alert category upon a determination to generate the alert.

21. The computer program product of claim 20, wherein said computer readable medium further comprises:

code for causing the at least one computer to control, based on the wireless discovery signal statistical information, at least one of said assigning or said deciding.

22. The computer program product of claim 20, wherein said computer readable medium further comprises:

code for causing the at least one computer to control, based on a user alert setting, at least one of said assigning, said determining, or said deciding.

* * * * *